US008473474B1

(12) United States Patent
Eisenreich

(10) Patent No.: US 8,473,474 B1
(45) Date of Patent: *Jun. 25, 2013

(54) GRANULARITY-ADAPTIVE EXTRACTION OF CORRELATION STRUCTURES IN DATABASES

(75) Inventor: Katrin Eisenreich, Dresden (DE)

(73) Assignee: SAP AG, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/432,786

(22) Filed: Mar. 28, 2012

(51) Int. Cl.
*G06F 17/30* (2006.01)
*G06F 7/00* (2006.01)

(52) U.S. Cl.
USPC .............................. 707/705; 705/35; 705/37

(58) Field of Classification Search
USPC ....................... 707/705; 705/37, 35
See application file for complete search history.

(56) References Cited

U.S. PATENT DOCUMENTS

| | | | |
|---|---|---|---|
| 7,920,992 B2* | 4/2011 | Rutenbar et al. | 703/2 |
| 2004/0111358 A1* | 6/2004 | Lange et al. | 705/37 |
| 2004/0133439 A1 | 7/2004 | Noetzold et al. | |
| 2004/0225629 A1 | 11/2004 | Eder | |
| 2005/0025342 A1* | 2/2005 | Lee et al. | 382/107 |
| 2005/0027645 A1 | 2/2005 | Lui | |
| 2006/0184473 A1 | 8/2006 | Eder | |
| 2008/0256069 A1 | 10/2008 | Eder | |
| 2009/0182774 A1 | 7/2009 | Krig | |
| 2011/0081955 A1* | 4/2011 | Lange et al. | 463/6 |
| 2012/0022995 A1* | 1/2012 | Lange | 705/37 |
| 2012/0066194 A1* | 3/2012 | Eisenreich | 707/705 |

OTHER PUBLICATIONS

P. Agrawal et al., Trio: A System for Data, Uncertainty, and Lineage, in VLDB '06: Proceedings of the 32nd International Conference on Very Large Data Bases, pp. 1151-1154. VLDB Endowment, Sep. 2006.
H. Arnold, Dependence Modelling Via the Copula Method, CSIRO Mathematical and Information Services, Technical report, Feb. 2006, retrieved from http://www.cmis.csiro.au/techreports/docs/x00001cd.pdf. 33 pages.
D. Behan et al., "A procedure for simulation with constructed copulas," retrieved from www.soa.org/files/pdf/rsrch-final-instr-copula.pdf, accessed Jun. 7, 2010, 13 pages.
O. Benjelloun et al., "Databases with Uncertainty and Lineage," The VLDB Journal—The International Journal on Very Large Data Bases, vol. 17, issue 2, pp. 243-264, Mar. 2008.

(Continued)

*Primary Examiner* — Kuen Lu
(74) *Attorney, Agent, or Firm* — Fish & Richardson P.C.

(57) ABSTRACT

Implementations include generating a first plurality of univariate distributions based on known data stored in a computer-readable database, each univariate distribution of the plurality of distributions comprising an arbitrary distribution, processing the univariate distributions and the known data to generate an empirical ACR provided as a multi-dimensional histogram, storing the empirical ACR in the computer-readable database, retrieving, from computer-readable memory, a second plurality of univariate distributions, each univariate distribution in the second plurality of univariate distributions being associated with a respective set of uncertain values that are to be correlated to a respective set of uncertain values associated with one or more other univariate distributions in the second plurality of univariate distributions, processing the empirical ACR and the second plurality of univariate distributions to generate a correlation histogram that represents a correlation between the respective sets of uncertain values and storing the correlation histogram in the computer-readable database.

20 Claims, 12 Drawing Sheets

OTHER PUBLICATIONS

R. Cheng et al., "Efficient join processing over uncertain data," In CIKM '06: Proceedings of the 15th ACM international conference on Information and knowledge management, pp. 738-747, New York, NY, Nov. 2006.

J. Huang et al., "A Probabilistic Database Management System," In SIGMOD '09: Proceedings of the 35th SIGMOD international conference on Management of data, pp. 1071-1074, New York, NY, Jun. 29-Jul. 2, 2009.

Y. Ioannidis, "The history of histograms (abridged)," In Proceedings of the 29th International Conference on Very Large Data Bases (VLDB), Sep. 2003, Berlin, Germany, 12 pages.

R. Jampani et al., "MCDB: A Monte Carlo Approach to Managing Uncertain Data," In SIGMOD '08: Proceedings of the 2008 ACM SIGMOD international conference on Management of data, pp. 687-700, New York, NY, Jun. 9-12, 2008.

T. Kroll, "Copula Based Risk Aggregation," retrieved from www.azarmi.org/wp-content/.../copula-based-risk-aggregation.pdf, Dec. 2, 2009, 21 pages.

V. Ljosa et al., "Indexing arbitrary probability distributions," In Data Engineering, 2007, ICDE 2007, IEEE 23rd International Conference on Tools with Artificial Intelligence, pp. 946-955, Nov. 7-9, 2007.

Mathworks, "Simulation of dependent random variables using copulas," retrieved from www.mathworks.com/products/demos/statistics/copulademo.html, 2010, accessed Jul. 6, 2010, 16 pages.

Viswanath Poosala et al., "Improved Histograms for Selectivity Estimation of Range Predicates," Proceedings of the 1996 ACM SIGMOD International Conference on Management of Data (SIGMOD '96), Montreal, Quebec, Canada, Jun. 4-6, 1996, pp. 294-305.

Anish Das Sarma et al., "Exploiting lineage for confidence computation in uncertain and probabilistic databases," Proceedings of the 2008 IEEE 24th International Conference on Data Engineering, pp. 1023-1032, Apr. 2008, Washington, DC.

Prithviraj Sen et al., "Representing and querying correlated tuples in probabilistic databases," In Data Engineering, 2007, ICDE 2007, 23rd IEEE International Conference on Tools with Artificial Intelligence, Nov. 7-9, 2011, Boca Raton, Florida, pp. 596-605.

Sarvjeet Singh et al., "Orion 2.0: Native Support for Uncertain Data," In SIGMOD '08: Proceedings of the 2008 ACM SIGMOD, pp. 1239-1242, Jun. 9-12, 2008, Vancouver, BC, Canada.

Claudio Romano, "Applying Copula Function to Risk Management," Apr. 2002, 25 pages.

Embrechts, P., et al., "Modelling Dependence with Copulas and Applications to Risk Management," Handbook of Heavy Tailed Distributions in Finance, Sep. 10, 2001, 50 pages.

IBM Corporation,"DB2 Version 9.1 for z/OS: SQL Reference," http://publib.boulder.ibm.com/infocenter/dzichelp/v2r2/index.jsp?topic=%2Fcom.ibm.db2z9.doc.sqlref%2Fsrc%2Ftpc%2Fdb2z_bif_correlation.htm, Dec. 2011, 2173 pages.

I. Kojadinovic et al., "Modeling Multivariate Distributions with Continuous Margins Using the copula R Package," In Journal of Statistical Software, May 2010, vol. 34, Issue 9, pp. 1-20.

Oracle, "Database QL Reference," http://docs.oracle.com/cd/B19306_01/server.102/b14200/functions028.htm, Dec. 2005, 1428 pages.

Prithviraj Sen et al., "PrDB: Managing and Exploiting Rich Correlations in Probabilistic Database," The International Journal on Very Large Data Bases, vol. 18, Issue 5, Oct. 2009, pp. 1065-1090.

C. Sirangelo, "Approximate Query Answering on Multi-dimensional Data," PhD Thesis, University of Calabria, Oct. 21, 2005, 168 pages.

IBM Corporation, "SPSS Statistics Base 20—Chapter 12: Bivariate Correlations," 2011, retrieved from <ftp://public.dhe.ibm.com/software/analytics/spss/documentation/statistics/20.0/en/client/Manuals/IBM_SPSS_Statistics_Base.pdf>, 328 pages.

IBM Corporation, "SPSS Advanced Statistics 20—Chapter 2: GLM Multivariate Analysis," 2011, retrieved from <ftp://public.dhe.ibm.com/software/analytics/spss/documentation/statistics/20.0/en/client/Manuals/IBM_SPSS_Advanced_Statistics.pdf>, 184 pages.

VoseSoftware, ModelRisk 4—Empirical Copula, retrived from <http://vosesoftware.com/ModelRiskHelp/index.htm#Help_on_ModelRisk/Copulas/Copulas_in_ModelRisk.htm>, 2007, 575 pages.

Jens Lemcke etl al., "Computing a Canonical Hierarchical Schema," Enterprise Interoperability V Proceedings of the I-ESA Conferences, vol. 5, Aug. 2012, pp. 305-315.

Kastner and Saia, "The Composite Applications Benchmark Report," Aberden Group, Dec. 2006, 25 pages.

Gartner Inc., Technology Research [Online], http://www.gartner.com/technology/home.jsp. [Accessed: Sep. 30, 2011].

D. Beneventano et al., *"The MOMIS approach to Information Integration,"* International Conference on Enterprise Information Systems (ICEIS 2001), Setúbal, Portugal, Jul. 7-10, 2001, pp. 194-198.

K. Saleem et al., "PORSCHE: Performance ORiented SCHEma mediation,"*Information Systems*, vol. 33, Issue 7-8, Nov. 2008, pp. 637-657.

C. Delobel et al., "Semantic integration in Xyleme: a uniform tree-based approach," *Data & Knowledge Engineering*, vol. 44, No. 3, pp. 267-298, Mar. 2003.

R.D.S. Mello et al., "BInXS: A Process for Integration of XML Schemata," 17th International Conference on Advanced Information Systems Engineering (CAiSE 2005), Porto, Portugal, Jun. 13-17, 2005, Lecture Notes in Computer Science, vol. 3520, pp. 151-166.

Liaison Technologies, "Working with Canonicals: Using Contivo to Bring Canonicals/COMs/CIMs to Life," White Paper, Integration and Data Management, 2010, 16 pages.

Crossgate AG, Crossgate: EDI Managed Services, E-Invoicing, SAP PI, Supply Chain Analytics [Online], http://www.crossgate.de/. [Accessed: Sep. 29, 2011].

J. Madhavan et al., "Generic Schema Matching with Cupid," Proceedings of the 27th VLDB Conference, Roma Italy, Sep. 2001, pp. 49-58.

* cited by examiner

GRANULARITY-ADAPTIVE EXTRACTION OF CORRELATION STRUCTURES IN DATABASES

BACKGROUND

In many instances, such as business intelligence (BI) and risk analysis, correlation in historic data and assumed correlation in future data are considered to provide an analysis result. For example, investigating the effect of data dependencies on business developments can help prevent inaccurate estimations of risk and opportunity in a business context. Consequently, correlation is an important factor when analyzing data, and uncertain data in particular.

In some instances, correlation assumptions can be provided using techniques based on copula functions. Copula-based techniques enable analysts to introduce arbitrary correlation structures between arbitrary distributions and calculate relevant measures over the arbitrarily correlated data. To apply such techniques, correlation structures can be represented and processed in an approximate fashion. In some examples, using a parametric construction of approximate correlation representations (ACRs), purely assumed correlation patterns can be applied and represented.

In some instances, it may be necessary to extract correlation from historic data. In this manner, for example, the extracted correlation pattern can be applied to uncorrelated data, for which a similar correlation is assumed. In order to extract correlation information from historic data, a correlation coefficient can be extracted, whose computation is supported by default database systems. Generally, databases support only the computation of a scalar correlation coefficient (e.g., Pearson's correlation, Spearman's Rho) from a set of sample data. Consequently, correlation extraction using such methods is limited to linear correlations calculated under the limited assumption that the underlying marginal distributions are (close to) normal (otherwise, the computed correlation information is not correct). Another challenge is that the extraction and storing of correlation structures may lead to large storage, access, and processing costs.

SUMMARY

Implementations of the present disclosure include methods of extracting an approximate empirical correlation representations at runtime (query time), and the processing of empirical correlation structures for correlation handling in databases. In some implementations, methods include generating a first plurality of univariate distributions based on known data stored in a computer-readable database, each univariate distribution of the plurality of distributions including an arbitrary distribution, processing the univariate distributions and the known data to generate an empirical ACR provided as a multi-dimensional histogram, storing the empirical ACR in the computer-readable database, retrieving, from computer-readable memory, a second plurality of univariate distributions, each univariate distribution in the second plurality of univariate distributions being associated with a respective set of uncertain values that are to be correlated to a respective set of uncertain values associated with one or more other univariate distributions in the second plurality of univariate distributions, processing the empirical ACR and the second plurality of univariate distributions to generate a correlation histogram that represents a correlation between the respective sets of uncertain values and storing the correlation histogram in the computer-readable database.

In some implementations, the methods further include executing an operator within the computer-readable database, the operator performing at least generating, retrieving and processing actions.

In some implementations, processing of the empirical ACR and the second plurality of univariate distributions includes, for each bin of the empirical ACR, determining bin center-point coordinates including a first coordinate and a second coordinate, using the first coordinate as input to an inversion function corresponding to a first univariate distribution to provide a third coordinate, using the second coordinate as input to an inversion function corresponding to a second univariate distribution to provide a fourth coordinate, determining a weight associated with the bin and applying the weight to a correlation bin of the correlation histogram, the correlation bin corresponding to the third coordinate and fourth coordinate.

In some implementations, processing of the empirical ACR and the second plurality of univariate distributions includes for each bin of the empirical ACR determining a weight associated with the bin, identifying a plurality of arbitrarily distributed samples within the bin and for each sample of the plurality of arbitrarily distributed samples determining a sample coordinate comprising a first coordinate and a second coordinate, using the first coordinate as input to an inversion function corresponding to a first univariate distribution to provide a third coordinate, using the second coordinate as input to an inversion function corresponding to a second univariate distribution to provide a fourth coordinate, and applying a correlation weight to a correlation bin of the correlation histogram, the correlation bin corresponding to the third coordinate and fourth coordinate.

In some implementations, processing the empirical ACR and the second plurality of univariate distributions is applied for m dimensions, where m is greater than two, and the empirical ACR is provided as an m-dimensional ACR to couple m univariate distributions based on m sample coordinates per sample within each bin.

In some implementations, each univariate distribution in the second plurality of univariate distributions includes arbitrarily distributed marginal distributions.

In some implementations, each univariate distribution in the first plurality of univariate distributions includes arbitrarily distributed marginal distributions.

In some implementations, the bins of the empirical ACR each include a weight that is determined based on samples of the copula.

In some implementations, the univariate distributions in the first plurality of univariate distributions are of a different type than one another.

In some implementations, the univariate distributions in the first plurality of univariate distributions are of a same type as one another.

In some implementations, the first plurality of univariate distributions includes two or more univariate distributions.

In some implementations, methods further include displaying the correlation histogram on a display.

In some implementations, methods further include receiving user input, the user input specifying one or more regions of the empirical ACR within which nested ACR bins are to be provided, wherein processing the univariate distributions to generate an empirical ACR further includes processing the user input. In some implementations, the empirical ACR includes one or more nested ACR bins corresponding to the one or more regions. In some implementations, each nested ACR bin includes a higher granularity than the granularity of the nesting empirical ACR. In some examples, the correlation histogram includes one or more nested ACR bins corresponding to the one or more nested ACR bins of the empirical ACR.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. In some implementations, the system includes a display, one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to the extraction of approximate empirical correlation representations at runtime (query time), and the processing of empirical correlation structures for correlation handling in databases. More specifically, implementations of the present disclosure provide for the efficient derivation of approximate correlation representations (ACRs) from known data directly at the database, rather than using pre-computed ACRs. Implementations also enable the specification of granular representations of regions within the ACR for an adaptive degree of accuracy. Implementations of the present disclosure enable the extraction, and subsequent introduction and handling of correlation of known data. Known data includes historical data, from which univariate marginal distributions can be determined. For example, an insurance company can collect and analyze insurance claims for events such as burglary and vehicle theft claims. Given present data about a plurality of arbitrarily distributed, known data sets (e.g., burglary and vehicle theft claims), a correlation between the known data sets can be extracted. The correlation can be considered for further processing of the data.

Implementations of the present disclosure enable the extraction and introduction of different forms of dependency structures over values with arbitrary marginal distributions, because multivariate distributions (discussed in further detail below) are neither uniquely defined by their marginal distributions nor their correlation factor. Instead, correlation can follow different patterns. For example, values can correlate strongly in the "middle" of the value ranges or in the "extreme values." In analysis and forecasting, it can be valuable to see the implications of different known dependency patterns. For example, to compute an expected impact when extreme values of fuel prices imply extreme increases of some related material price, while a minor fuel price increase might have no immediate effect on material prices.

Figure 1:
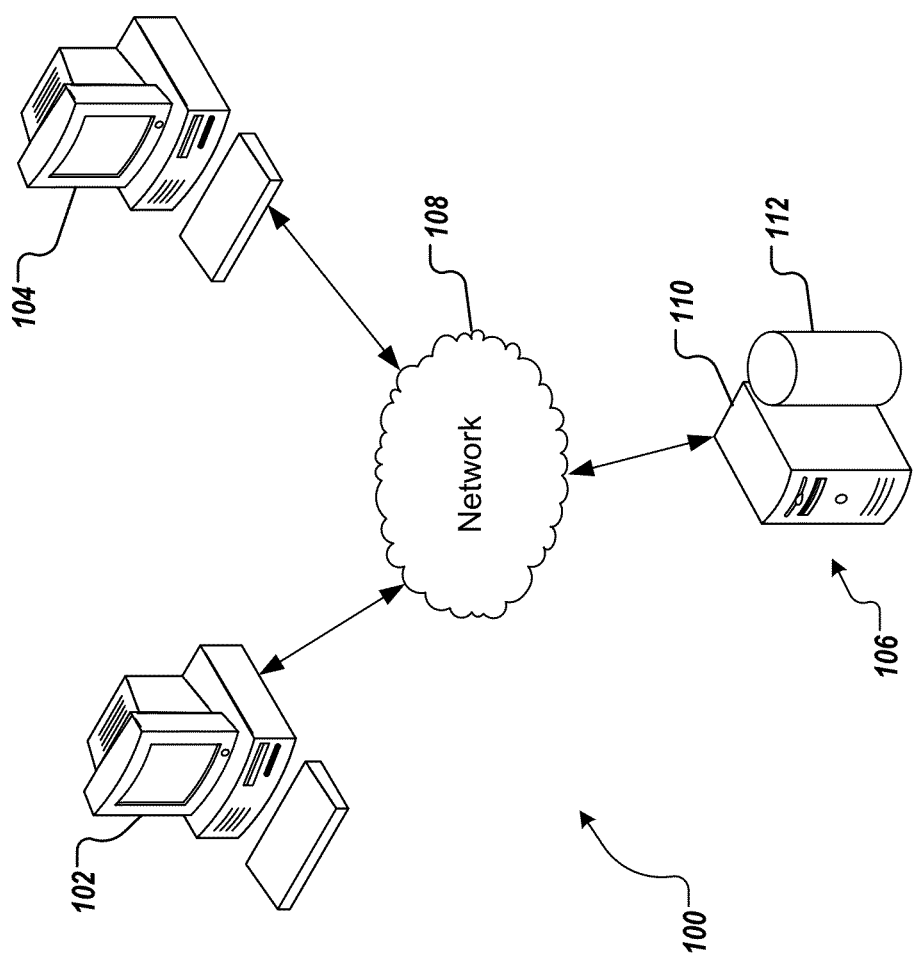
FIG. 1 depicts an example system architecture that can execute implementations of the present disclosure.

FIG. 1 depicts an example system 100 that can execute implementations of the present disclosure. The system 100 includes a computing device 102, a computing device 104, a server/database system 106 and a network 108. The computing devices 102, 104 and the server/database system 106 can communicate with one another over the network. The computing devices 102, 104 can include any type of computing device, such as a desktop computing device, a laptop computing device, a handheld computing device (e.g., a personal digital assistant (PDA)), and/or a smartphone. The server/database system 106 includes a computing device 110 and a computer-readable and -writable memory, or database 112. The computing device 110 can perform operations in accordance with implementations of the present disclosure, and the database 112 can store information, as discussed in further detail herein. The network 108 can be provided as a large computer network, such as a local area network (LAN), wide area network (WAN), the Internet, a cellular network, or a combination thereof connecting any number of computing devices and server systems.

Implementations of the present disclosure address the extraction, introduction, storage, and application of approximate correlation information to a database containing known data (i.e., values). This enables the representation of and access to different dependency structures using ACRs at the database level, and correlation of known data following arbitrary marginal distributions. In some implementations, the respective density functions of the arbitrary marginal distributions are generically represented in a histogram-based form.

In accordance with implementations of the present disclosure, an empirical copula is generated based on historical data, and an ACR is built over the empirical copula. The empirical copula is provided as a set of copula samples, which reflect a distribution function that represents correlations between univariate distributions of the known data (historical data). In some implementations, a data set (historical data) is provided in a database and can include data collected for multiple data classes. For each class, a marginal distribution is computed. In some examples, the marginal distributions are provided as equi-width histograms based on the data values provided in the data set. In some implementations, the marginal distributions are provided in symbolic form, i.e., as parameterized distributions functions, such as a Gaussian, a Gamma, or a Uniform distribution. Copula samples are generated based on the marginal distributions to define the copula sample set. The ACR, provided as a histogram, is generated based on the copula sample set, and represents a dependency between the known values. In some implementations, the ACR includes adaptive granularity, such that specified bins within the ACR provide enhanced detail as compared to other bins within the ACR.

Implementations of the present disclosure are illustrated herein with reference to an example context. The example context includes the analysis of correlated insurance claims. More particularly, types of insurance claims in the example context can include burglary claims and vehicle theft claims. In this example context, an analyst may want to learn about the correlation structure of historic weekly insurance claim numbers in order to incorporate the historic correlation in a forecast analysis (e.g., analyzing forecast values (uncertain values)). For example, the analyst may want to introduce the same correlation to initially uncorrelated forecast values of related claim classes. In the example context, the weekly insurance claim numbers can be provided over a pre-defined period of time (e.g., twenty years (1990-2009)), which can be provided in database tables. In the example context, the weekly insurance claims can be provided as value pairs ($b_i$, $v_i$), where b indicates burglary claims and v indicates vehicle theft claims.

It is appreciated that the example context is used herein to illustrate implementations of the present disclosure. Implementations of the present disclosure are equally applicable in any other appropriate context (e.g., effects of fuel prices on material prices, effects of economic development and disposable income, effects of oil price on stock price of a company providing renewable energy, effects of sales between competing products ("market cannibalization")).

Figure 2:
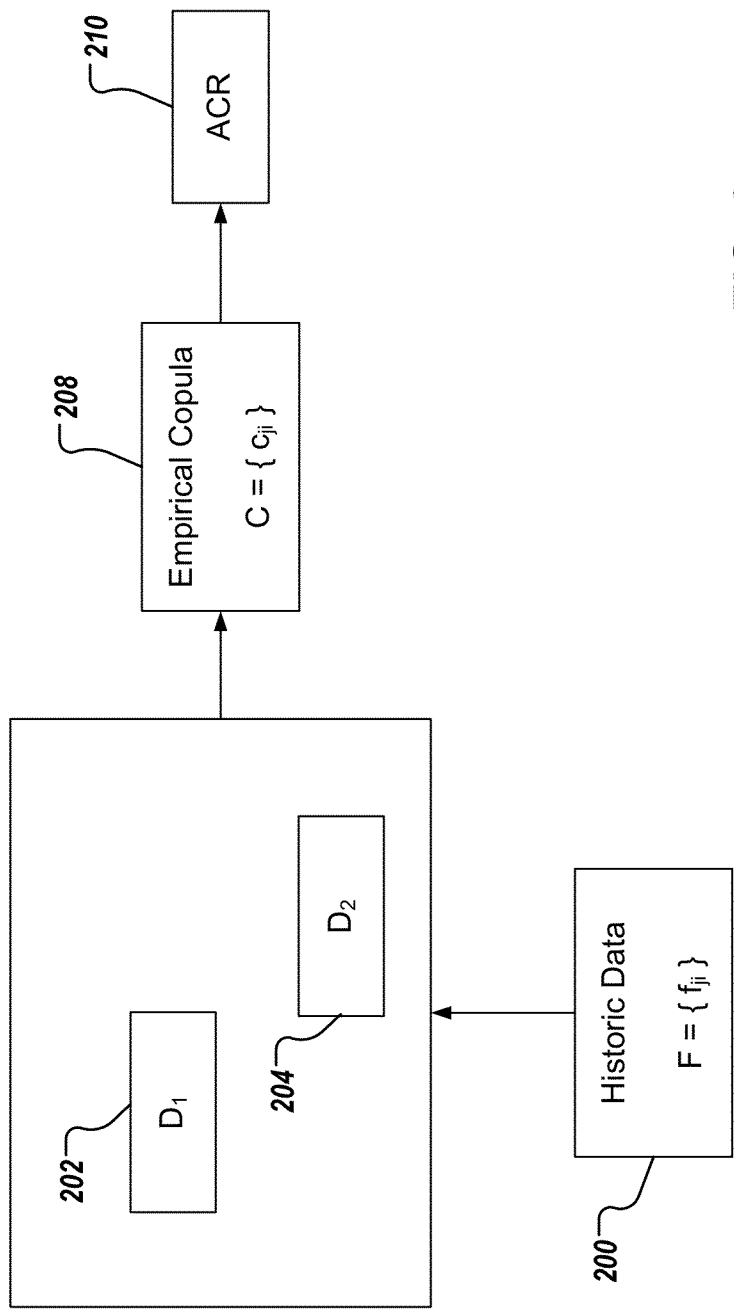
FIG. 2 depicts an example copula extraction using known data values.

FIG. 2 depicts an example process for copula extraction using known data values. In the example of FIG. 2, a data set 200 (historical fact data (F)) is provided and includes data samples ($f_{ji}$) corresponding to multiple data classes (dimensions j, j=1, . . . , m). Without restriction of generality, the following considers the bivariate case, i.e., the processing of correlation between sample data with two dimensions (data classes). In the bivariate case, $F=\{\{f_{1i}\},\{f_{2i}\}\}$. Respective univariate distributions ($D_1$, $D_2$) 202, 204 for the respective data classes can be computed. Implementations of the present disclosure are equally applicable to cases where fact data represents more than two dimensions (data classes).

In some implementations, a common parameter of the known data sets can be a particular period of time. In the example context, the known data sets can include burglary claims and vehicle theft claims over the pre-defined time period. The example univariate distributions 202, 204 can depict the distributions ($D_b$, $D_v$) associated with the burglary claims and the vehicle theft claims, respectively. Here, a univariate distribution is a distribution of only one known variable. By combining the data sets using the common parameter, a multivariate distribution can be provided, as discussed in further detail below. Here, a multivariate distribution is a joint probability distribution of the data sets. In the example context, reported vehicle burglaries are likely to be positively correlated with vehicle thefts.

A correlation can be extracted from the distributions and can be provided as an empirical copula (C) 208 provided as a copula sample set including multiple copula sample value coordinates ($c_{ji}$). Empirical copulas are discussed in further detail below. The empirical copula 208 provides a dependency between the known values (e.g., burglary claims and vehicle theft claims. An ACR 210 can be built using the empirical copula 208, as discussed in further detail herein.

Figure 3B:
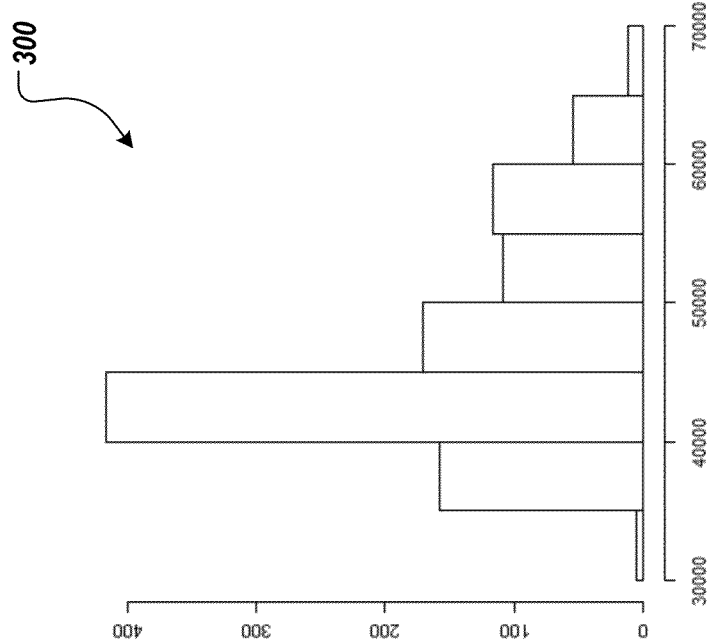
FIGS. 3A and 3B depict example univariate distributions associated with known data.
Figure 3A:
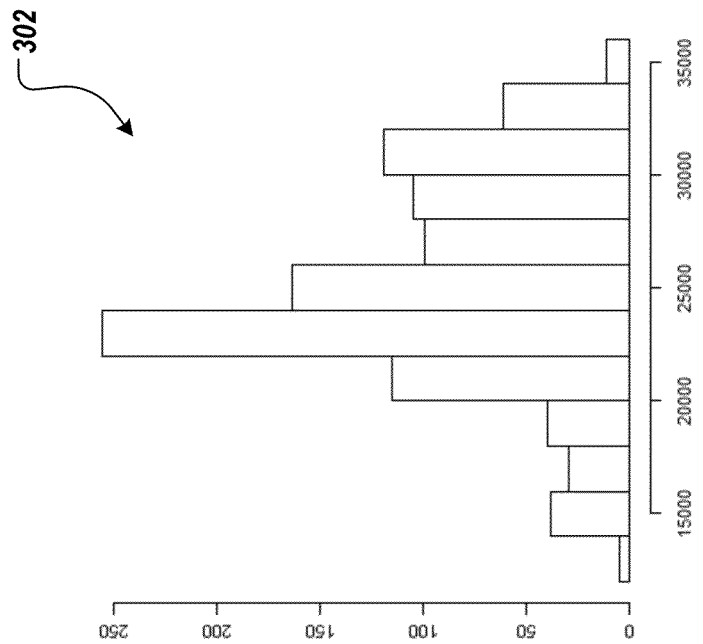
Figure 3C:
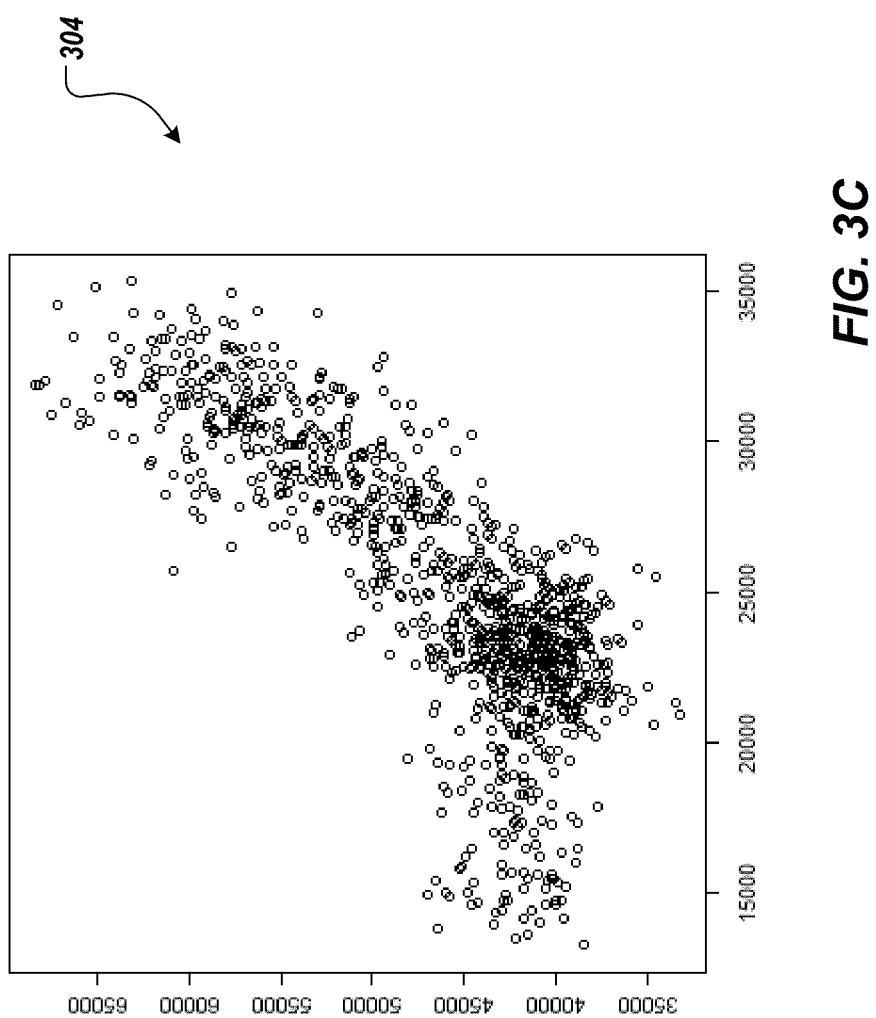
FIG. 3C depicts an example multivariate distribution based on example fact data, where each dimension is associated with one of the example univariate distributions of FIGS. 3A and 3B.

With particular reference to FIGS. 3A and 3B, the graphs 300, 302 depict example univariate distributions that can be determined based on known data. In the example context, FIGS. 3A and 3B provide non-limiting examples of the marginal univariate distribution of burglary claims and vehicle theft claims per week, respectively, over the pre-defined time period (e.g., 1990-2009, for a total of 1040 weeks). The data is plotted in the form of a histogram, illustrating the frequency of claim occurrence per week over the pre-defined time period. That is, the histograms respectively indicate the number of claims that were typically recorded per week over the pre-defined period. FIG. 3C depicts an example graph 304 of a multivariate (joint) distribution as embodied in the known historical data, and with the example univariate distributions of FIGS. 3A and 3B as marginal distributions. By way of non-limiting example, the multivariate distribution can indicate the variation of weekly burglary claims with respect to weekly vehicle theft claims. The multivariate distribution illustrates the probability distribution of the known data contained in the selected subset, for example, in weekly intervals, and indicates a correlation between the data.

Figure 4:
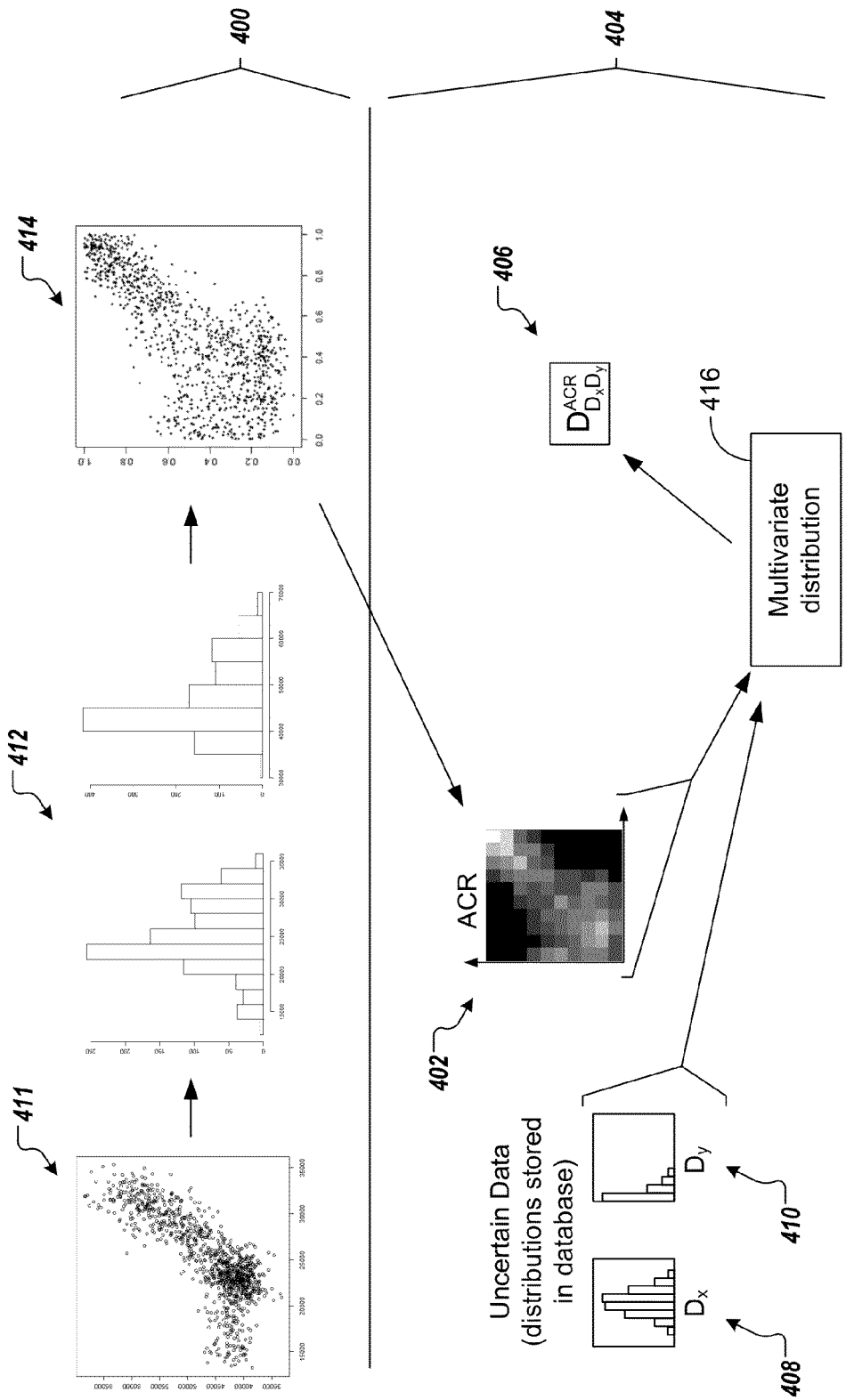
FIG. 4 is a diagram of a general process for generating and using an approximate correlation representation (ACR) to provide a correlation between multiple distributions.

Referring now to FIG. 4, generation of an ACR will be discussed in further detail. In the depicted example, a first portion 400 generally illustrates a posteriori specification and computation of an empirically-based ACR 402 based on known data, and a second portion 404 generally illustrates the use of the ACR 402 to generate a correlation ($D^{ACR}$) 406 between a first distribution ($D_x$) 408 and a second distribution ($D_y$) 410, corresponding to first and second forecast values (or other examples of uncertain values), respectively. In portion 400, m univariate distributions are determined based on known data (e.g., $F=\{f_{ji}\}$, where i=1, . . . , |F|, and j=1, . . . , m). In the depicted example, m is equal to 2. More particularly, a multivariate distribution 411 is provided based on the known data. Multiple univariate distributions 412 are determined from the multivariate distribution 411. Samples of an empirical copula (C) are generated from the univariate distributions. In the depicted example, a multivariate distribution 414 can be provided based on the samples of the empirical copula. In short, the samples ($c_{1i}$, $c_{2i}$) of the empirical copula are extracted based on the determined univariate distributions 412 and the coordinates $x_i=f_{1i}$ and $y_i=f_{2i}$, where the samples ($c_{1i}$, $c_{2i}$) are plotted to provide the multivariate distribution 414.

As discussed in further detail below, the multivariate distribution 414 is converted to the respective ACR 402, which is provided as a multidimensional histogram, where the frequency values of samples underlying the multivariate distribution 414 are maintained. For example, lighter colors of the ACR histogram indicate higher sample frequencies and darker colors indicate lower sample frequencies. The generated ACR 402 can be stored in a data store for subsequent use. The ACR 402 can be viewed as a "template" structure for correlation of forecast values (uncertain values) provided in the data store. In this case, $D^{ACR}$ 406 is provided as a concrete instance of correlated values that is computed through application of the ACR 402 to the forecast values. Specifically, $D^{ACR}$ 406 is computed and stored as a multi-dimensional histogram. Frequencies of a resulting multidimensional distribution 416 are computed for each $z_x$, $z_y$ by summing frequencies from the ACR 402 to provide $D^{ACR}$ 406.

A copula (Latin for "link") is a distribution function (e.g., C: $[0, 1]^n \to [0, 1]$) whose one-dimensional marginals are uniformly distributed over $[0, 1]$. As noted above, a copula represents a functional relation between univariate distributions (e.g., the univariate distributions of FIGS. 3A and 3B) and their common multidimensional, or multivariate distribution (e.g., the multivariate distribution of FIG. 3C).

As noted above, m univariate distributions are determined based on known data (e.g., $F=\{f_{ji}\}$, where i=1, and j=1, ..., m). In the bivariate example (i.e., m=2), univariate distributions $D_1$, $D_2$ can be determined from known historic data (i.e., (e.g., $F=\{f_{ji}\}$, where i=1, ..., |F|, and j=1, 2)). To correlate the univariate distributions $D_1$, $D_2$ and generate an empirical copula (C), pairs of uniform transforms are determined for all the sample values. In some examples, the pairs of uniform transforms are determined by computing the values of the cumulative distribution functions (CDFs) of the marginal distributions $D_1$, $D_2$ (i.e., $c_{1i}=CDF(D_1, f_{1i})$, $c_{2i}=CDF(D_2, f_{2i})$). The empirical copula is provided as the set of sample coordinates $\{c_{ji}\}$. One or more ACRs can be generated using the empirical copula, as discussed in further detail herein.

The provided approach demonstrates the benefit of copulas enabling the representation of arbitrary correlation structures independently from distributions that are to be correlated. Accordingly, standard copulas can be built from basic bivariate distributions, such as the Gaussian copula and T-distribution copula, for example. Further, similar to the copulas generated and approximated offline, a copula can now be derived and approximated as an empirical ACR online from distributions of correlated values in a set of sample data, and the derived copula can be applied to distributions for which a similar correlation is assumed.

Figure 5C:
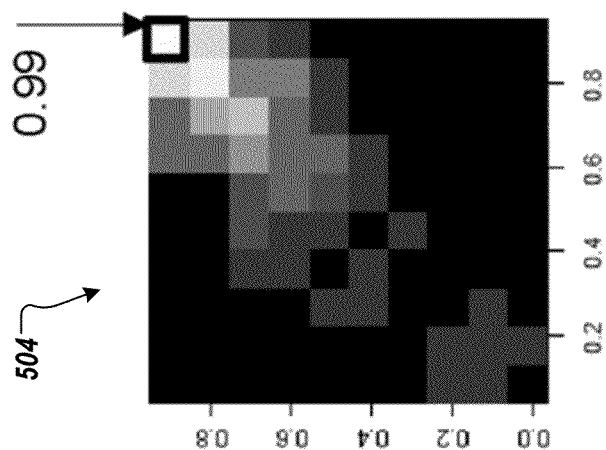
FIGS. 5A, 5B and 5C depict example ACRs based on extractions from respective portions of the underlying historic data.
Figure 5B:
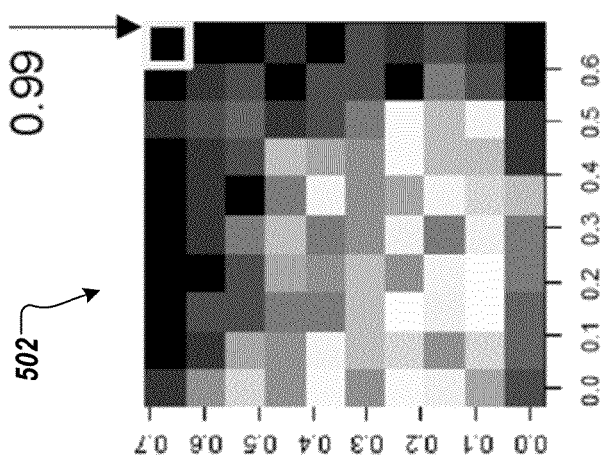
Figure 5A:
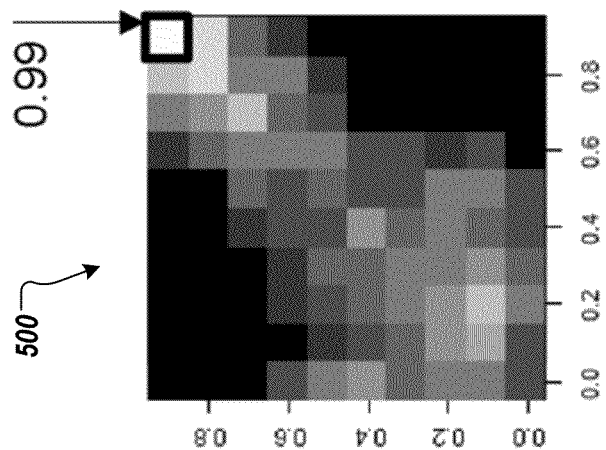

FIGS. 5A-5C provide respective ACRs 500, 502, 504 of respective copulas, which represent different structures of correlation. For example, the ACRs 500, 502, 504 can be derived over different time frames from the same set of known data pairs (e.g., values $(b_i, v_i)$) from the insurance claim example scenario. In the depicted example, and based on the example context, the ACRs 500, 502, 504 can be derived over different time frames from the same set of weekly fact value pairs. For example, the ACR 500 can be derived over the entire example period 1990-2009, while the ACRs 502, 504 can each be derived over respective time periods within the entire example period. The correlation structures of the ACRs 500, 502, 504 each deviate from a smoother correlation structure that would be produced for a parametrically constructed ACR (i.e., an ACR constructed from assumed correlation patterns). Therefore, a parametrically derived ACR might not be applicable to accurately represent the correlation structure in the historic data.

Figure 6:
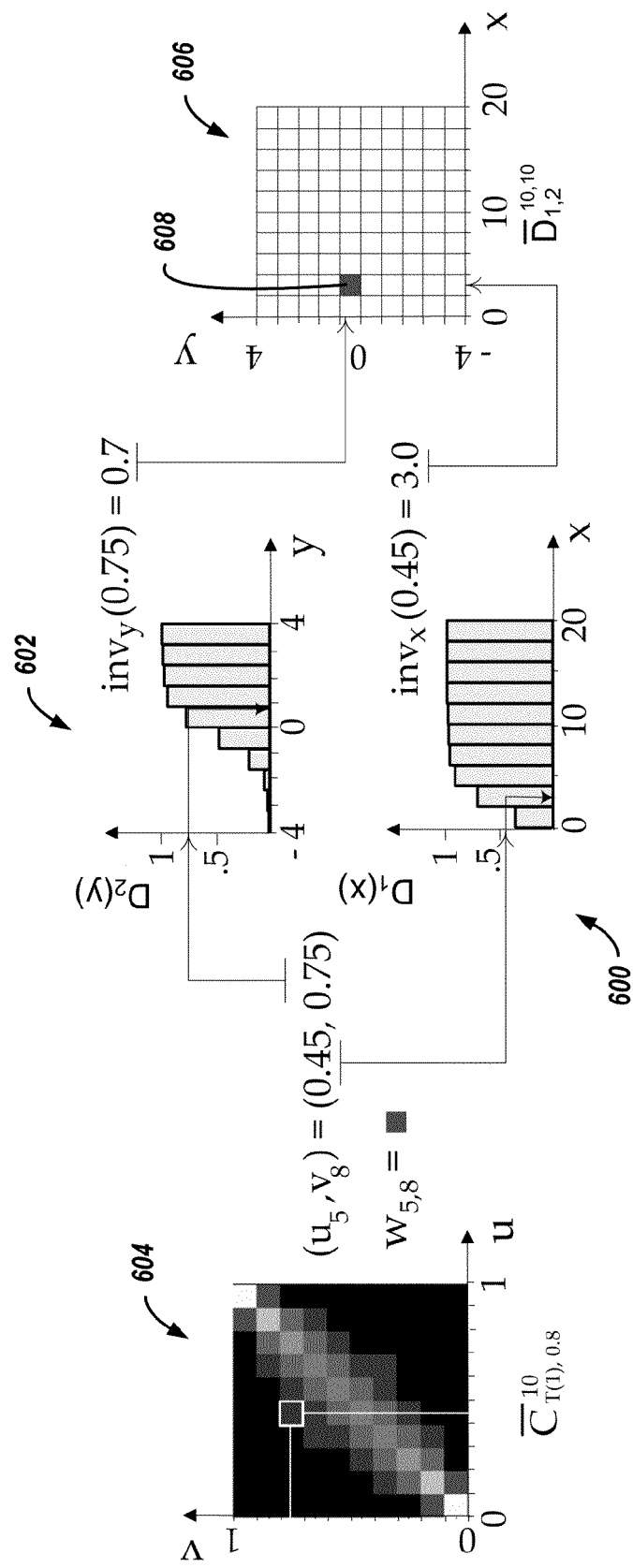
FIG. 6 depicts example calculations to introduce a correlation between univariate distributions.

Referring now to FIG. 6, construction of an example multivariate distribution $D^{ACR}$ from the empirical copula (e.g., portion 404 of FIG. 4) will be discussed in detail. In some implementations, and as discussed above, distributions can be determined from known data and can be stored as (univariate) equi-width histograms, that assume a uniform distribution within each bin. FIG. 6 illustrates histograms $$\bar{D}_1^{\beta_1}, \bar{D}_2^{\beta_2},$$

600, 602, respectively, for two cumulative distributions $D_1$ and $D_2$. The number of bins per histogram is denoted by $\beta$ (e.g., $\beta_1=\beta_2=10$). By disposing of a function inv, quantiles of $D_1$ and $D_2$ can be approximately computed for a distribution by accessing a selected ACR 604 (i.e., an ACR determined from an empirical copula). This is extended to enable the use of a correlation extracted from known data, resulting in a joint distribution represented as a bi-dimensional histogram $$\bar{D}_{1,2}^{\beta_1, \beta_2}$$

606. Internally, the copula approach is applied to represent and process the specified correlation. For processing a given ACR, as discussed in further detail herein, such quantiles are computed for bin centers or for uniformly distributed samples per bin of the ACR.

In some implementations, constructing and applying copulas can involve potentially expensive computations that can be executed by calls to statistical library functions, for example. To be independent of external functions and to avoid the associated costs at runtime, the copula approach is closely integrated at the database level. To achieve this, one or more empirical copulas are pre-computed and are stored directly in the database as respective ACRs. Because storing and accessing a high number of samples for each copula may be impractical (e.g., for correlating n>2 distributions), ACRs can instead be stored as multidimensional histograms over the samples underlying the empirical copulas. Specifically, $$\bar{C}_{H,d}^{\beta}$$

is used to denote the ACR of copula $C_{H,d}$ with $\beta \cdot \beta$ bins. Multiple ACRs can be stored to reflect different structures (e.g., derived over different time frames from the same set of known data pairs). This incurs only relatively small digital memory costs due to the small size of the ACRs.

There are multiple benefits to using ACRs as a pre-computed approximate structure. As one example benefit, a decrease in computation time is achieved, because the approximate information is already present at the database and needs not to be computed at runtime. Complex function calls are reduced to histogram accesses and only simple computations are used over the accessed values. Consequently, a second example benefit is gained via independence from statistical libraries and their distribution-specific functions.

Figure 7B:
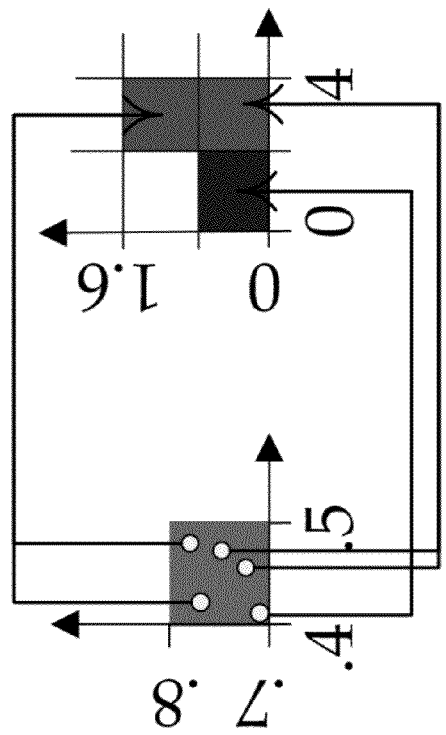
FIG. 7B illustrates distribution of the weight value in the histogram.
Figure 7A:
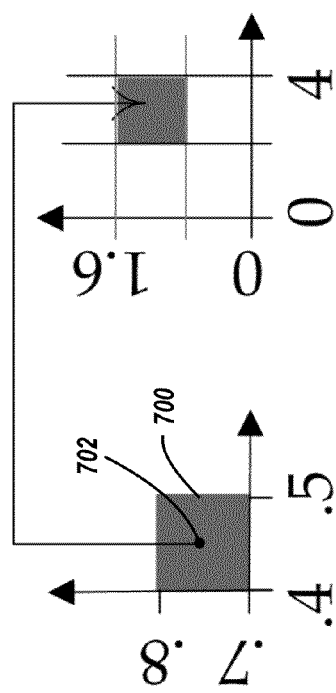
FIG. 7A illustrates a basic assignment of a weight value in a histogram.

Referring now to FIGS. 6, 7A and 7B, the derivation of an example bivariate distribution by applying an ACR based on an empirical copula will be described. In general, an instance of correlated uncertain values can be provided in a histogram $D^{ACR}$ based on an ACR. More specifically, the ACR can be provided as a "template" structure for correlation, and $D^{ACR}$ as a concrete instance of correlated values computed through application of the ACR.

In the depicted example, a $D^{ACR}$ is generated based on an ACR and univariate distributions $D_1$, $D_2$ generated from uncertain data. An example bivariate distribution can be represented by $$\bar{D}_{1,2}^{10,10}$$

with marginals $D_1$, $D_2$, which can be represented through histograms $$\bar{D}_1^{10} \text{ and } \bar{D}_2^{10}.$$

A user can select an empirically-derived ACR from the plurality of pre-computed ACRs stored in memory. By way of non-limiting example, an ACR bin corresponding to $$\bar{C}_{T(1), 0.8}^{10}$$

is selected. To process the ACR, an inversion approach is applied to the aggregated empirical information represented by each bin of the ACR. Two example approaches will be described for processing the aggregated information.

With particular reference to FIG. 7A, in a basic approach, the center 702 of a bin $b_{i,j}$ 700 (where i, j=1, . . . , 10) in $$\overline{C}_{T(1),0.8}^{10}$$

is to provide the bin's coordinates $(u_i, v_j)$ (e.g., $(u_5, v_8)$=(0.45, 0.75) of FIG. 6). The associated density value is used as a weight $(w_{i,j})$ (e.g., $w_{5,8}$ of FIG. 6) in the following inversion. In particular, $inv_x(u_i)$ and $inv_y(v_j)$ are applied to derive the quantiles of $D_1$ and $D_2$. The weight $w_{i,j}$ (e.g., $w_{5,8}$ of FIG. 6) is added to the density of the bin in $$\overline{D}_{1,2}^{10,10},$$

to which $(inv_x(u_i), inv_y(v_j))$ is assigned. This is shown on the right side of FIG. 6, where the shaded bin 608 in $$\overline{D}_{1,2}^{10,10}$$

606 indicates the added density value $w_{i,j}$.

In the example of FIG. 6, $u_5$ is equal to 0.45, which is used as an input to the distribution histogram of $D_1$ to determine the inverse cumulative density, or the quantile of $D_1$ at 0.45. In other words, inversion is applied to determine a value of $D_1$ for a given input value. In the example case, the corresponding value $D_1(x)$ is equal to 3.0. In the example of FIG. 6, $v_8$ is equal to 0.75, which is used as an input to the distribution histogram of $D_2$ to determine the inverse cumulative density, or the quantile of $D_2$ at 0.75. In other words, inversion is applied to determine a value of $D_2$ corresponding to a given input value. In the example case, the corresponding value $D_2(y)$ is equal to 0.7. $D_1(x)$ and $D_2(y)$ define the coordinate identifying the location in the correlation histogram where the weight $w_{i,j}$ is applied. This process is repeated for each bin of the ACR histogram.

This basic approach can result in a discretization error, because only one discrete pair of coordinates per bin $b_{i,j}$ is considered. To address this, and to compensate for a part of the discretization introduced in the construction of the ACR, the basic approach is extended by applying a "reverse sampling" process. In some implementations, assuming a uniform distribution of the samples that contributed to each bin $b_{i,j}$, a number of uniformly distributed samples can be drawn per bin $b_{i,j}$. The relative number of samples to be drawn is based on the associated weight $w_{i,j}$. The inversion approach is applied to each of the samples, each sample having an associated pair of coordinates $(u_x, u_y)$.

The number of samples can be determined in various manners. In some implementations, ACR bin weights (i.e., $w_{i,j}$) can be provided in relative or absolute form. For example, given a copula built from X samples (e.g., 100000 samples), if Y samples (e.g., 2000 samples) fall into bin $b_{i,j}$, then weight $w_{i,j}$ is the quotient of Y and X (i.e., $w_{i,j}$=Y/X) (e.g., 0.02 or 2000 in relative or absolute form, respectively). When given in absolute form, the number of samples can be determined directly based on the weight, or as a fraction of the weight. When given in relative form, the number of samples can be derived as the relative part of a provided total number.

FIG. 7B illustrates the resulting dispersion of the aggregated density value $w_{i,j}$ of each ACR bin to different bins of the resultant distribution. This dispersion results from drawing a number of uniformly distributed samples per ACR bin, relative to the bin weight. Because multiple samples are considered with varying center coordinates (i.e., $u_x$, $u_y$) within an ACR bin, the computation of the quantiles for $D_1$ and $D_2$ also results in correlation coordinates that fall into different bins of the resultant correlation histogram. This process is performed for each of bin to provide the correlation histogram $$\overline{D}_{1,2}^{10,10}.$$

As an example for an analysis where a specific region of the derived ACRs is of relevance, the user may want to analyze a specific region within the multivariate distribution. In the example context, the user may want to analyze the risk that both the weekly amount of burglary and vehicle theft claims are above a high threshold, e.g., the $99^{th}$ percentile of each of the marginal distributions. Those thresholds and the relevant areas are marked in each ACR of FIGS. 5A-5C. In the example ACRs of FIGS. 5A-5C, it is shown that the $99^{th}$ percentile only covers a fraction of the bin $b_{10,10}$ of the extracted correlation structure. Therefore, an analysis of the correlation structure in this granularity would lead to a low accuracy. This is because the density contained in the area [0.99,1.0]×[0.99,1.0] is interpolated from the density contained in bin $b_{10,10}$. For example, assuming a uniform distribution, the resulting density would be computed as 1/10*1/10*$w_{10,10}$, which may not be the true density contained in the area. Consequently, a more accurate representation (e.g., by β=100 bins in each dimension) would enable a more accurate analysis.

In accordance with implementations of the present disclosure, and to achieve improved accuracy, the ACR based on the empirical copula is constructed with an adaptive granularity, providing for a higher accuracy of a subsequently generated $D^{ACR}$ based on the ACR. In some examples, and as discussed in further detail below with reference to FIG. 8, the adaptive granularity can depend on the region(s) of most interest using nested histograms within the ACR.

Figure 8:
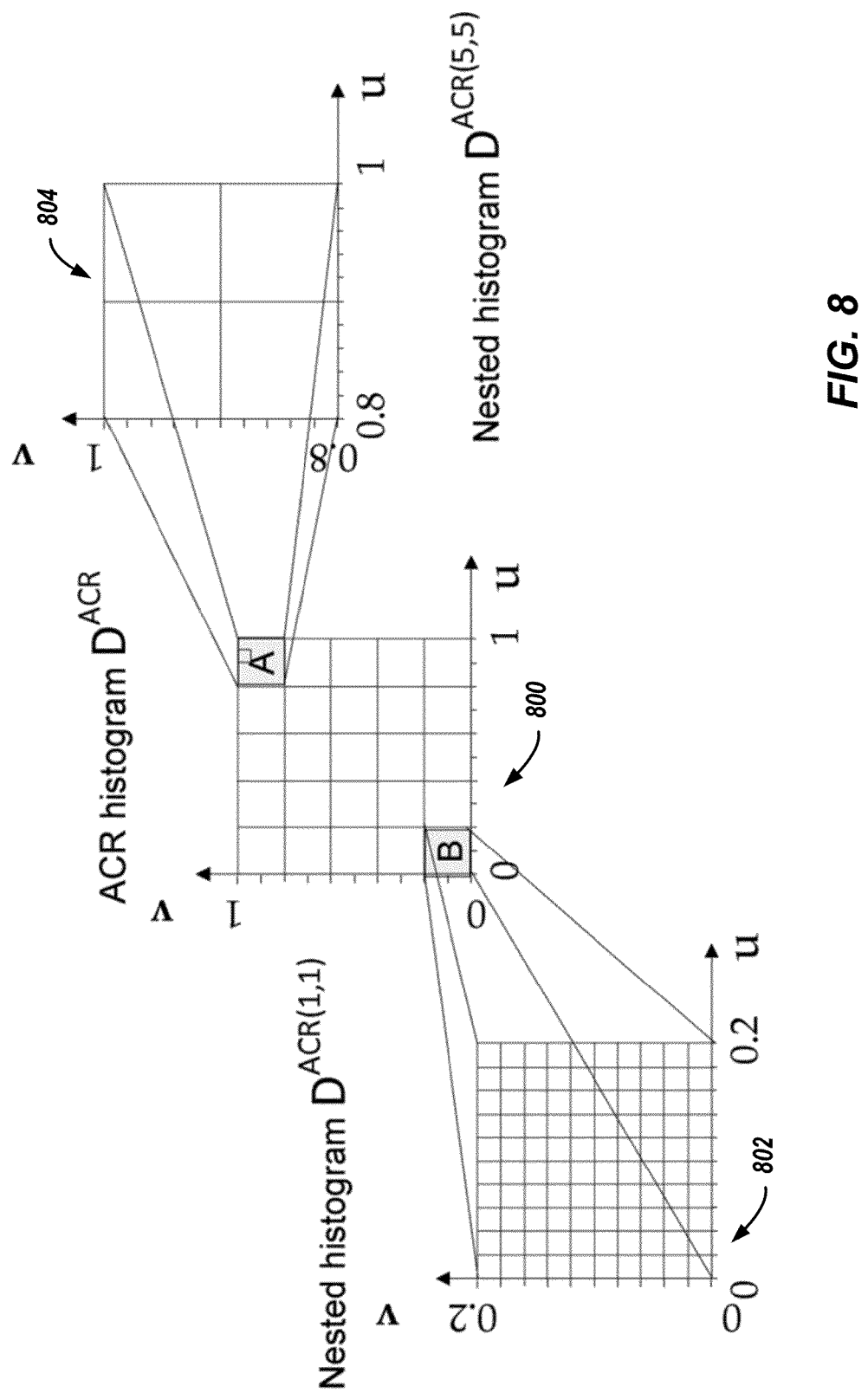
FIG. 8 depicts example nested histograms within an example ACR.

FIG. 8 depicts example nested histograms 802 and 804 within an example $D^{ACR}$ 800. To enable a precise approximation of the selected regions, a user can explicitly specify the nesting structure of the histogram. By way of non-limiting example, FIG. 8 illustrates the representation through nested histograms for two examples. The histogram $D^{ACR}$ 800 can comprise multiple bins (e.g. (β=5, i.e., corresponding to 5*5 bins). Each bin $b_{j,k}$ holds a density value $w_{j,k}$, which reflects the mass that lies within this bin in the represented correlation structure. A representation through a small number of bins (e.g. 5*5 bins) can lead to a poor representation accuracy, particularly for regions that exhibit a high variance. The overall histogram of $D^{ACR}$ 800 is nesting other histograms (e.g. $D^{ACR(1,1)}$ 802 and $D^{ACR(5,5)}$ 804). Each nested histogram corresponds to a particular bin. For example histograms $D^{ACR(1,1)}$ 802 corresponds to bin $b_{1,1}$ with 10*10 bins and $D^{ACR(5,5)}$ 804 to bin $b_{5,5}$ with 2*2 bins. The representation of $b_{5,5}$ is more accurate than that of the overall histogram (because the bin is represented by four smaller bins), and the representation of $b_{1,1}$ is highly accurate (because the bin is represented by 100 smaller bins).

In some implementations, using nested histograms increases the accuracy of the selected regions (e.g., joint tail regions) of the ACR 800, but the overall required computer memory remains relatively low. The conservation of memory is possible because only selected bins are represented in a higher granularity, while the remaining copula regions may be represented in a coarse-granular fashion, as is the case in the provided example. Representing the complete ACR 800 in the same accuracy as $b_{1,1}$ (i.e., 10*10) would require a total of 100*100 bins (i.e., 10,000 bins). The use of selective granularities enables more accurate representation of relevant regions. In the example of FIG. 8, a total of 129 bins are provided (e.g., 5*5+2*2+10*10=129 bins) with finer grained bin distribution being provided in relevant regions.

In some implementations, the user can define the required nested histogram specifications for each desired bin of the basic histogram. Each such specification includes the bin id (e.g., $b_{5,5}$) and the desired granularity (e.g., $\beta_{5,5=2}$). Thus, for the above example, the user would provide parameter pairs ($b_{1,1}$, 10), ($b_{5,5}$, 2) to specify the nested histograms 802 and 804. In some implementations, the specification of nested histograms can be determined based on applied heuristics. For example, the bins with very high variance (e.g., the bins with the k highest variances) can automatically be represented through a nested histogram.

Figure 9A:
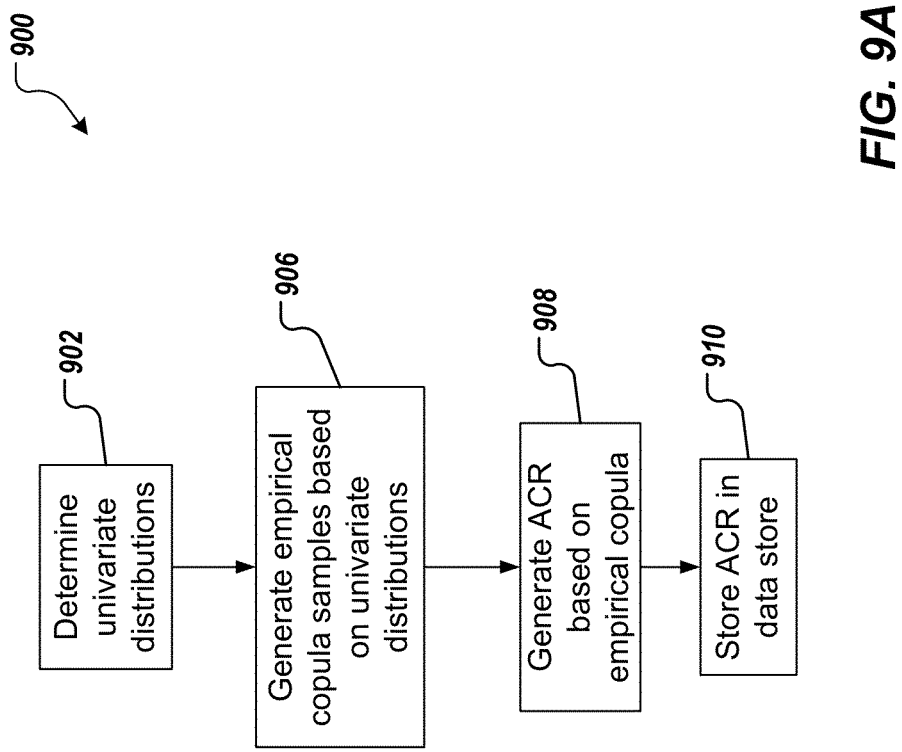
FIG. 9A is a flowchart illustrating an example process for generating an empirical ACR.

FIG. 9 is a flowchart depicting an example process 900 for generating an ACR from known sample data. In some implementations, the example process 900 can be executed using one or more computing devices (e.g., the computing device 102 and/or the computing device 104 of FIG. 1). In some implementations, the example process 900 can be executed directly in a database (e.g., the database 112). For example, an operator, provided as a computer-executed program, can operate directly in the database to perform actions discussed herein in a highly efficient manner close to the data.

Univariate marginal distributions are computed from known data (902). The univariate distributions can be computed based on known data (historic data) acquired over a period of time (e.g., reported burglary and theft data). For example, the operator can generate the univariate distributions based on known data stored in the database. Samples of an empirical copula are computed based on the provided multivariate fact data and the previously computed univariate distributions (906). The larger the number of known data values used in generating the multivariate distribution, the more accurately the resultant empirical copula tracks the multivariate distribution. An ACR is generated based on the empirical copula (908). For example, the operator generates the ACR by populating bins of a multi-dimensional histogram based on frequency of copulas values (e.g., in the set $C=\{c_{ji}\}$). In some examples, the ACR can include adaptive granularity, such that specified bins have a higher granularity than other bins of the ACR. For example, a user can specify one or more bins of the ACR that are to include nested bins having a higher bin count than non-nested bins, as discussed above with reference to FIG. 8. The ACR is stored in a data store (910) and the process 900 ends. For example, the ACR can be stored directly in the database, within which the ACR was generated.

Figure 9B:
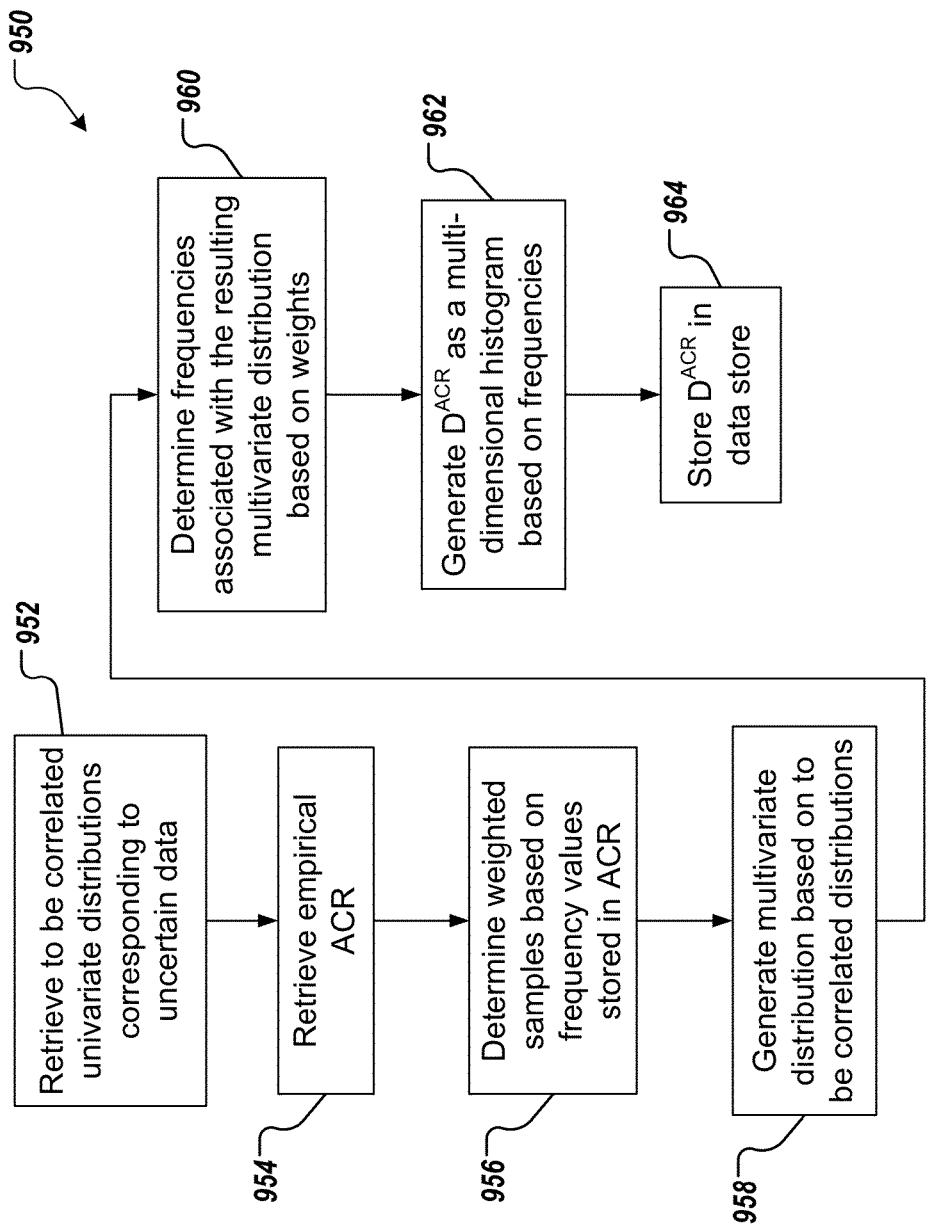
FIG. 9B is a flowchart illustrating an example process for introducing a correlation, represented through a previously extracted empirical ACR, between uncertain values.

FIG. 9B is a flowchart depicting an example process 950 for introducing a correlation $D^{ACR}$ between uncertain values (e.g., forecast values) having respective univariate distributions (e.g., $D_1$, $D_2$). In some implementations, the example process 950 can be executed directly in a database (e.g., the database 112). For example, an operator, provided as a computer-executed program, can operate directly in the database to perform actions discussed herein.

To be correlated univariate distributions are retrieved (952). For example, the database can include uncertain data and can generate corresponding univariate distributions based thereon. An empirical ACR is retrieved (954). For example, the database can retrieve an empirical ACR that was generated based on known data corresponding to the to be correlated data (e.g., insurance claims).

Weighted samples are determined based on frequency values of the ACR (956). For example, the database can process the ACR to determine the weighted samples. A multivariate distribution is generated based on the to be correlated univariate distributions (e.g., $D_x$, $D_y$ in FIG. 4) (958). Frequencies associated with the resulting multivariate distribution are computed from weights associated with the weighted samples from the ACR (960). For example, the database can determine the frequencies for the multivariate distribution. The frequencies can be determined based on assigning the weight of an ACR bin to the resulting correlation histogram bin as a total, or dispersing the weight based on uniformly distributed samples, as discussed in detail above. A multivariate distribution $D^{ACR}$ is generated as a multi-dimensional histogram based on the frequencies (962). For example, the database can generate $D^{ACR}$ as a multi-dimensional histogram based on the frequencies. In some examples, the $D^{ACR}$ can include adaptive granularity, such that specified bins have a higher granularity than other bins of the $D^{ACR}$. For example, a user can specify one or more bins of the underlying empirical ACR that are to include nested bins having a higher bin count than non-nested bins, as discussed above with reference to FIG. 8. $D^{ACR}$ is stored in a data store (964) and the process 950 ends.

Figure 10:
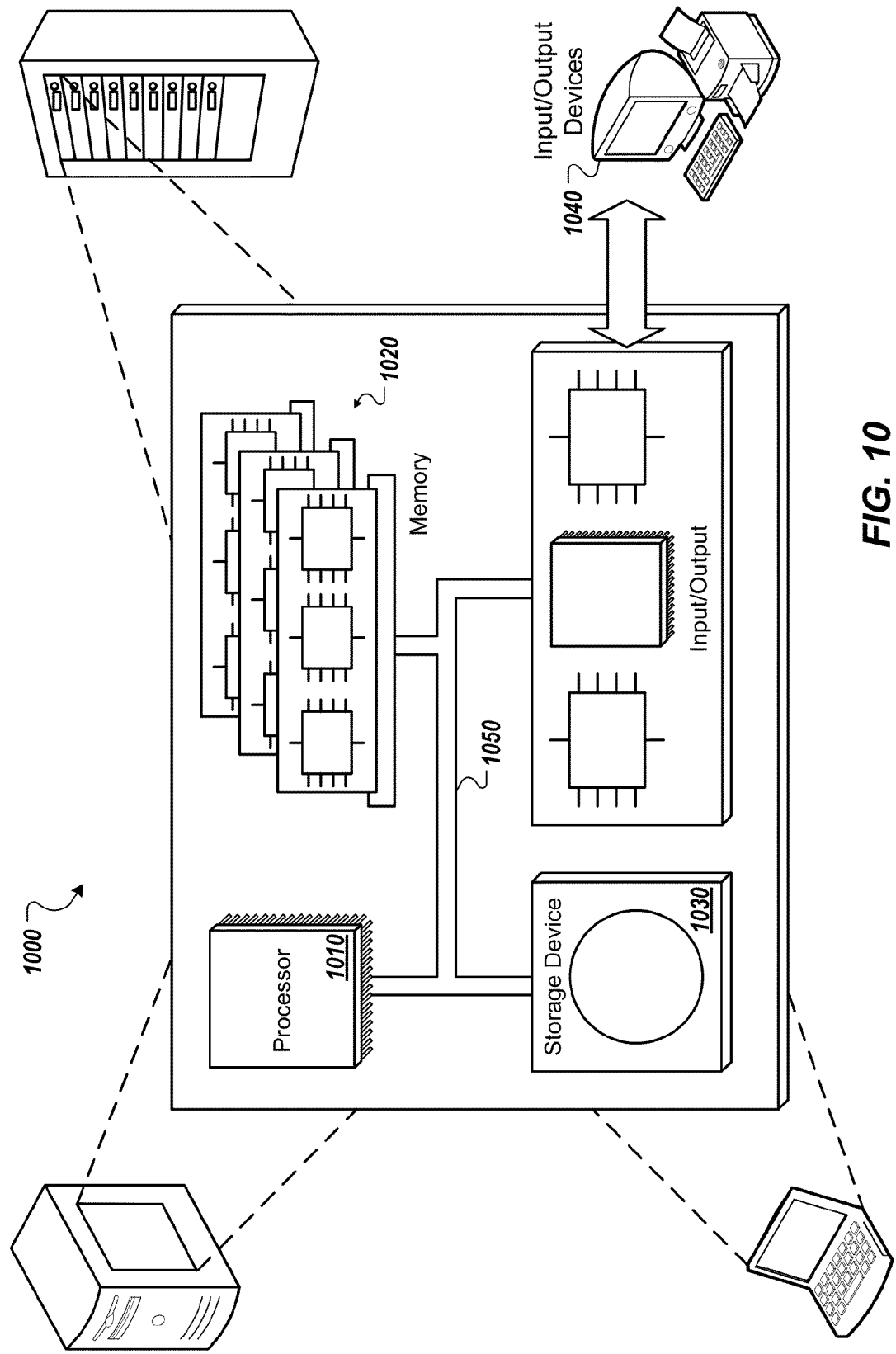
FIG. 10 is a schematic illustration of example computer systems that can be used to execute implementations of the present disclosure.

Referring now to FIG. 10, a schematic diagram of an example computing system 1000 is provided. The system 1000 can be used for the operations described in association with the implementations described herein. For example, the system 1000 may be included in any or all of the server components discussed herein. The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit. The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device. The input/output device 1040 provides input/output operations for the system 600. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method of correlating a plurality of uncertain values, comprising:
    generating a first plurality of univariate distributions based on known data stored in a computer-readable database, each univariate distribution of the plurality of distributions comprising an arbitrary distribution;
    processing the univariate distributions and the known data to generate an empirical approximate correlation representation (ACR) provided as a multi-dimensional histogram;
    storing the empirical ACR in the computer-readable database;
    retrieving, from computer-readable memory, a second plurality of univariate distributions, each univariate distribution in the second plurality of univariate distributions being associated with a respective set of uncertain values that are to be correlated to a respective set of uncertain values associated with one or more other univariate distributions in the second plurality of univariate distributions;
    processing the empirical ACR and the second plurality of univariate distributions to generate a correlation histogram that represents a correlation between the respective sets of uncertain values; and
    storing the correlation histogram in the computer-readable database.

2. The method of claim 1, further comprising executing an operator within the computer-readable database, the operator performing at least generating, retrieving and processing actions.

3. The method of claim 1, wherein processing the empirical ACR and the second plurality of univariate distributions comprises:
    for each bin of the empirical ACR:
        determining bin center-point coordinates comprising a first coordinate and a second coordinate;
        using the first coordinate as input to an inversion function corresponding to a first univariate distribution to provide a third coordinate;
        using the second coordinate as input to an inversion function corresponding to a second univariate distribution to provide a fourth coordinate;
        determining a weight associated with the bin; and
        applying the weight to a correlation bin of the correlation histogram, the correlation bin corresponding to the third coordinate and fourth coordinate.

4. The method of claim 1, wherein processing the empirical ACR and the second plurality of univariate distributions comprises:
    for each bin of the empirical ACR:
        determining a weight associated with the bin;
        identifying a plurality of arbitrarily distributed samples within the bin; and
        for each sample of the plurality of arbitrarily distributed samples:
            determining a sample coordinate comprising a first coordinate and a second coordinate;

using the first coordinate as input to an inversion function corresponding to a first univariate distribution to provide a third coordinate;

using the second coordinate as input to an inversion function corresponding to a second univariate distribution to provide a fourth coordinate; and applying a correlation weight to a correlation bin of the correlation histogram, the correlation bin corresponding to the third coordinate and fourth coordinate.

5. The method of claim 4, wherein processing the empirical ACR and the second plurality of univariate distributions is applied for m dimensions, where m is greater than two, and the empirical ACR is provided as an m-dimensional ACR to couple m univariate distributions based on m sample coordinates per sample within each bin.

6. The method of claim 4, wherein a number of samples in the plurality of arbitrarily distributed samples is determined based on the weight.

7. The method of claim 4, wherein the correlation weight is determined based on the weight and a number of samples corresponding to the correlation bin.

8. The method of claim 1, wherein each univariate distribution in the second plurality of univariate distributions comprises arbitrarily distributed marginal distributions.

9. The method of claim 1, wherein each univariate distribution in the first plurality of univariate distributions comprises arbitrarily distributed marginal distributions.

10. The method of claim 1, wherein bins of the empirical ACR each include a weight that is determined based on samples of the copula.

11. The method of claim 1, wherein univariate distributions in the first plurality of univariate distributions are of a different type than one another.

12. The method of claim 1, wherein univariate distributions in the first plurality of univariate distributions are of a same type as one another.

13. The method of claim 1, wherein the first plurality of univariate distributions comprises two or more univariate distributions.

14. The method of claim 1, further comprising displaying the correlation histogram on a display.

15. The method of claim 1, further comprising receiving user input, the user input specifying one or more regions of the empirical ACR within which nested ACR bins are to be provided, wherein processing the univariate distributions to generate an empirical ACR further comprises processing the user input.

16. The method of claim 15, wherein the empirical ACR comprises one or more nested ACR bins corresponding to the one or more regions.

17. The method of claim 15, wherein each nested ACR bin includes a higher granularity than the granularity of the nesting empirical ACR.

18. The method of claim 15, wherein the correlation histogram comprises one or more nested ACR bins corresponding to the one or more nested ACR bins of the empirical ACR.

19. A non-transitory computer-readable storage medium coupled to one or more processors and having instructions stored thereon which, when executed by the one or more processors, cause the one or more processors to perform operations, the operations comprising:

generating a first plurality of univariate distributions based on known data stored in a computer-readable database, each univariate distribution of the plurality of distributions comprising an arbitrary distribution;

processing the univariate distributions and the known data to generate an empirical approximate correlation representation (ACR) provided as a multi-dimensional histogram;

storing the empirical ACR in the computer-readable database;

retrieving, from computer-readable memory, a second plurality of univariate distributions, each univariate distribution in the second plurality of univariate distributions being associated with a respective set of uncertain values that are to be correlated to a respective set of uncertain values associated with one or more other univariate distributions in the second plurality of univariate distributions;

processing the empirical ACR and the second plurality of univariate distributions to generate a correlation histogram that represents a correlation between the respective sets of uncertain values; and storing the correlation histogram in the computer-readable database.

20. A system, comprising:

a display;

one or more processors; and a computer-readable storage medium coupled to the one or more processors and having instructions stored thereon which, when executed by the one or more processors, cause the one or more processors to perform operations, the operations comprising:

generating a first plurality of univariate distributions based on known data stored in a computer-readable database, each univariate distribution of the plurality of distributions comprising an arbitrary distribution;

processing the univariate distributions and the known data to generate an empirical approximate correlation representation (ACR) provided as a multi-dimensional histogram;

storing the empirical ACR in the computer-readable database;

retrieving, from computer-readable memory, a second plurality of univariate distributions, each univariate distribution in the second plurality of univariate distributions being associated with a respective set of uncertain values that are to be correlated to a respective set of uncertain values associated with one or more other univariate distributions in the second plurality of univariate distributions;

processing the empirical ACR and the second plurality of univariate distributions to generate a correlation histogram that represents a correlation between the respective sets of uncertain values; and storing the correlation histogram in the computer-readable database.

* * * * *